US012707367B2

(12) United States Patent
Kaasalainen et al.

(10) Patent No.: US 12,707,367 B2
(45) Date of Patent: Aug. 11, 2026

(54) SERVICE ROUTING FOR USER EQUIPMENT

(71) Applicant: Nokia Technologies Oy, Espoo (FI)

(72) Inventors: Janne Veikko Kaasalainen, Espoo (FI); Tero Henttonen, Espoo (FI); Malgorzata Tomala, Wroclaw (PL); Daniela Laselva, Aalborg (DK)

(73) Assignee: Nokia Technologies OY, Espoo (FI)

( * ) Notice: Subject to any disclaimer, the term of this patent is extended or adjusted under 35 U.S.C. 154(b) by 297 days.

(21) Appl. No.: 18/433,633

(22) Filed: Feb. 6, 2024

(65) Prior Publication Data

US 2024/0284295 A1 Aug. 22, 2024

(30) Foreign Application Priority Data

Feb. 17, 2023 (FI) .................................... 20235195

(51) Int. Cl.
*H04W 76/10* (2018.01)
*H04W 40/02* (2009.01)
*H04W 88/08* (2009.01)

(52) U.S. Cl.
CPC ........... *H04W 40/02* (2013.01); *H04W 76/10* (2018.02); *H04W 88/085* (2013.01)

(58) Field of Classification Search
CPC ..... H04W 40/02; H04W 76/10; H04W 40/00; H04W 76/11
See application file for complete search history.

(56) References Cited

U.S. PATENT DOCUMENTS 12,464,397 B2 * 11/2025 Kainulainen ......... H04W 24/10
2008/0254768 A1 * 10/2008 Faccin .................. H04W 76/10 455/411
2009/0010195 A1 * 1/2009 Gonsa ................. H04L 65/1016 370/312
2016/0241680 A1 * 8/2016 Cho ........................ H04L 69/18
2016/0344686 A1 * 11/2016 Guo .................... H04L 12/6418
2019/0110323 A1 * 4/2019 Wang .................... H04W 48/18
2019/0289492 A1 * 9/2019 Hampel ................ H04W 28/24
2020/0053686 A1 * 2/2020 Edge ..................... H04W 60/04
2021/0243672 A1 * 8/2021 Deshmukh ............ H04W 40/24
(Continued)

FOREIGN PATENT DOCUMENTS

WO 2020/257023 A1 12/2020
WO WO-2021062807 A1 * 4/2021 .............. H04W 8/12
(Continued)

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.
(Continued)

*Primary Examiner* — Fahmida S Chowdhury
(74) *Attorney, Agent, or Firm* — Harness, Dickey & Pierce, P.L.C.

(57) ABSTRACT

A method comprising receiving by a control-plane network entity a service request from a user equipment; selecting by the control-plane network entity at least one control plane routing identifier for the user equipment; and sending by the control-plane network entity the at least one control plane routing identifier to the user equipment.

19 Claims, 7 Drawing Sheets

(56) References Cited

U.S. PATENT DOCUMENTS

| | | | | |
|---|---|---|---|---|
| 2021/0392071 | A1 | 12/2021 | Kumar et al. | |
| 2022/0038948 | A1* | 2/2022 | Bangolae | H04W 28/0289 |
| 2022/0225129 | A1* | 7/2022 | Chen | H04W 24/04 |
| 2022/0256309 | A1 | 8/2022 | Syue et al. | |
| 2022/0330202 | A1* | 10/2022 | Kumar | H04W 60/00 |
| 2022/0369065 | A1* | 11/2022 | Wu | H04W 4/029 |
| 2023/0025738 | A1* | 1/2023 | Neelakantamurthy | H04W 76/10 |
| 2023/0309158 | A1* | 9/2023 | Qiao | H04W 72/1268 |
| 2024/0163709 | A1* | 5/2024 | Mildh | H04W 76/15 |
| 2024/0284295 | A1* | 8/2024 | Kaasalainen | H04W 76/11 |
| 2024/0410970 | A1* | 12/2024 | Manolakos | G01S 5/02 |

FOREIGN PATENT DOCUMENTS

| | | | | |
|---|---|---|---|---|
| WO | 2021/134723 | A1 | 7/2021 | |
| WO | WO-2021147107 | A1* | 7/2021 | H04W 40/36 |
| WO | 2021/179245 | A1 | 9/2021 | |
| WO | 2021/262946 | A1 | 12/2021 | |
| WO | 2022/081832 | A2 | 4/2022 | |
| WO | 2022/226838 | A1 | 11/2022 | |

OTHER PUBLICATIONS

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

"Evolution towards 5G-Advanced", 3GPP, Retrieved on Mar. 12, 2024, Webpage available at : https://www.3gpp.org/news-events/3gpp-news/ran-webinar-2021.

"5G-Advanced explained", Nokia, Retrieved on Mar. 12, 2024, Webpage available at : https://www.nokia.com/about-us/newsroom/articles/5g-advanced-explained/.

"Ericsson strengthens Cloud RAN portfolio with 5G mid-band support", Ericsson, Retrieved on Mar. 12, 2024, Webpage available at : https://www.ericsson.com/en/press-releases/2021/6/ericsson-strengthens-cloud-ran-portfolio-with-5g-mid-band-support.

PCT Application No. PCT/EP2024/051595, "Service based Radio Resource Control for Cloud Native RAN", filed on Jan. 24, 2024, pp. 1-27.

"Msc-generator", Sourceforge, Retrieved on Mar. 12, 2024, Webpage available at : https://sourceforge.net/projects/msc-generator/.

"Innovations in 5G backhaul technologies", A 5G Americas White Paper, Jun. 2020, 62 pages.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.3.0, Dec. 2022, pp. 1-1133.

"3rd Generation Partnership Project; Technical Specification Group Radio Access Network; NG-RAN; F1 application protocol (F1AP) (Release 17)", 3GPP TS 38.473, V17.3.0, Dec. 2022, pp. 1-698.

Office Action received for corresponding Finnish Patent Application No. 20235195, dated Aug. 24, 2023, 13 pages.

"Discussion on BAP configuration", 3GPP TSG-RAN WG2#108, R2-1915110, Agenda: 6.1.5.2, ZTE, Nov. 18-22, 2019, 5 pages.

"3rd Generation Partnership Project; Technical Specification Group Services and System Aspects; Procedures for the 5G System (5GS); Stage 2 (Release 18)", 3GPP TS 23.502, V18.3.0, Sep. 2023, pp. 1-899.

"3rd Generation Partnership Project; Technical Specification Group Core Network and Terminals; Non-Access-Stratum (NAS) protocol for 5G System (5GS); Stage 3; (Release 18)", 3GPP TS 24.501, V18.4.0, Sep. 2023, pp. 1-1159.

Extended European Search Report received for corresponding European Patent Application No. 24156177.8, dated Jun. 18, 2024, 9 pages.

"UE initiated Event Reporting Procedure for Low Power Event Reporting", 3GPP TSG-CT WG1 Meeting #124-e, C1-203365, Qualcomm Incorporated, Jun. 2-10, 2020, 3 pages.

* cited by examiner

401

Receive by a control-plane network entity a service request from a user equipment

402

Select by the control-plane network entity at least one control plane routing identifier for the user equipment

403

Send the at least one control plane routing identifier to the user equipment

SERVICE ROUTING FOR USER EQUIPMENT

TECHNICAL FIELD

The present invention relates to service routing for user equipment for cloud native radio resource control.

BACKGROUND 5G specifications provide an option to split the internal structure of an access node gNodeB (gNB) into entities called CU (Central Unit) and one or more DUs (Distributed Unit), which are connected by an F1 interface. This kind of split gNB architecture allows distributed Radio Access Network (RAN) deployments (i.e. gNB CU-DU split) and disaggregation of certain RAN network elements. This has led to a Control plane (C-plane) of the radio resource control protocol (RRC) being anchored in CU (as in 4G), but with its functionalities, such as configuration management of the lower layers, being split between a CU and a DU.

In 5G, the C-plane functionality in such RAN split architecture is also split, with a Centralized Unit Control Plane (CU-CP), a Centralized Unit User Plane (CU-UP) and DU components all including C-plane functionalities. A problem with the CU-DU split is increased central processing unit (CPU) processing need and also high latency. Extra CPU processing comes as the C-plane functionality is split to multiple network entities/components where needed configuration is done with long message scenarios between CU-CP, CU-UP and DU. This same scenario needs to be done for all requests not depending on what type of service the UE needs. When one node is sending or receiving a message it needs to code and decode the message and deliver it possibly using multiple protocol stacks. Whenever a node needs to stop algorithm and send a message for other node it needs extra work and also causes extra latency compared to a case when the algorithm could be performed in one instance. One purpose for the split architecture is to be able to utilize data centre type of central resources. This target may not be easy to reach if usage split architecture needs clearly more CPU resources and processing. This extra processing need may be even that big that the benefit of central resource usage comes very low or even negative. This may happen if the sum of processing for extra signalling in distributed node due to extra signalling comes the same or bigger than saved processing due to split architecture. This introduces further cumulative delays that cause overall signalling processing may not be able to meet latency requirements, for instance for 5G use case ultra-reliable low latency communications (URLLC).

In a split gNB architecture a network component has a defined task and every component is owing the data. For example, in 5G architecture 3GPP has defined gNB-DU tasks and also gNB-CU task. gNB-CU task is to handle RRC and also have the needed security context. So only the correct gNB-CU with the UE context is able to open RRC messages and verify the UE. This is not really a cloud native way. In cloud native solution algorithms and storage has been disaggregated and the UE request should be possible to process in optimal resource location.

In a 5G split architecture the CU configured higher layers and the DU configured lower layers. This aimed to use data central resource capacity to provide extra processing. This kind of fixed protocol split is actually also maximizing latency as all requests needs to be always performed in both CU and in DU. When taking into account these aspects the split architecture done for 5G is not really solving the problems that disaggregated architecture was meant to solve. The DU was meant to provide low latency and the CU extra processing capacity. Now split causes higher latency and very low or even zero extra processing capacity.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to some embodiments there is provided a control plane (C-plane) routing identifier (CRID) to allow network to route the message to the entity responsible for the specific control plane (CP), such as Radio Resource Control (RRC) message, Location Positioning Protocol (LPP) message or Non-Access Stratum (NAS) message. The control plane routing identifier may be inserted to messages sent using control plane resources, such as signalling radio bearer (SRB) messages, which will be sent to a UE, or received from the UE. The signalling radio bearers could also be generally piggybacked to other radio bearers, such as data radio bearers (DRBs) carrying user plane data, connectionless bearers carrying signalling or user plane data, or other types of radio bearers between UE and network. The CRID may be configured to the UE via a control plane protocol messaging, such as LPP, RRC or NAS messaging, for example, and then indicated within a lower layer protocol header in messages sent by the UE to the network to allow routing the message to a correct (distributed) control plane entity in the network, such as RRC or NAS entity. In this specification, the term "RRC" will be used to denote any control plane (CP) messages and the term "SRB" will be used to denote a bearer carrying such control plane messages:

The UE could be associated with one or more CRIDs, each associated with one or more specific RRC messages and/or RRC triggering conditions. Each CRID originates from a network entity configuring the associated C-plane configuration and radio resources. The protocol header could also relate to the CRID either explicitly (e.g. indicating the CRID in the header directly) or implicitly (e.g. indicating reference to an RRC structure that has the CRID configured). The header could also indicate one or more CRIDs in case the entire message or different parts of the same message are intended for multiple different C-plane entities in the network. The CRID could also be either SRB-specific or applicable to all SRBs.

Some benefits may be discovered when utilising the CRID. For example, the network can optimize usage of local c-plane resources in distributed units. Instead of using shared mode where a UE can be processed in multiple places, the network may define what computing resources can be used for the UE. The local resources may be used to provide low latency service for URLLC type of services, whereas for basic non-GBR can be used only remote c-plane resources. This may enable stateless architecture where network only processes messages as they arrive, stores the result of the process but does not store a specific state based on previous messages. The services may be provided based on service requests received from the UE or other network entity or entities, and may encompass both access stratum and non-access stratum requests.

According to a first aspect, there is provided an apparatus comprising means for receiving a service request from a user equipment; means for selecting at least one control plane routing identifier for the user equipment; and means for sending the at least one control plane routing identifier to the user equipment.

An apparatus according to a second aspect comprises at least one processor and at least one memory, said at least one memory stored with computer program code thereon, the at least one memory and the computer program code configured to, with the at least one processor, cause the apparatus at least to perform: receiving a service request from a user equipment; selecting at least one control plane routing identifier for the user equipment; and sending the at least one control plane routing identifier to the user equipment.

A method according to a third aspect comprises receiving by a control-plane network entity a service request from a user equipment; selecting by the control-plane network entity at least one control plane routing identifier for the user equipment; and sending by the control-plane network entity the at least one control plane routing identifier to the user equipment.

According to a fourth aspect, there is provided an apparatus comprising means for sending a service request to a control-plane network entity; means for receiving at least one control plane routing identifier from the control-plane network entity; and means for storing the at least one control plane routing identifier to a memory.

An apparatus according to a fifth aspect comprises at least one processor and at least one memory, said at least one memory stored with computer program code thereon, the at least one memory and the computer program code configured to, with the at least one processor, cause the apparatus at least to perform: sending a service request to a control-plane network entity; receiving at least one control plane routing identifier from the control-plane network entity; and storing the at least one control plane routing identifier to a memory.

A method according to a sixth aspect comprises sending a service request to a control-plane network entity; receiving at least one control plane routing identifier from the control-plane network entity; and storing the at least one control plane routing identifier to a memory.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms for carrying out the interface setup procedures involving Near-RT RICs. While the following focuses on 5G and/or 6G networks, the embodiments as described further below are by no means limited to be implemented in said networks only, but they are applicable in any network and protocol entities supporting the interfaces of the Near-RT RICs or equivalent entities.

Figure 1:
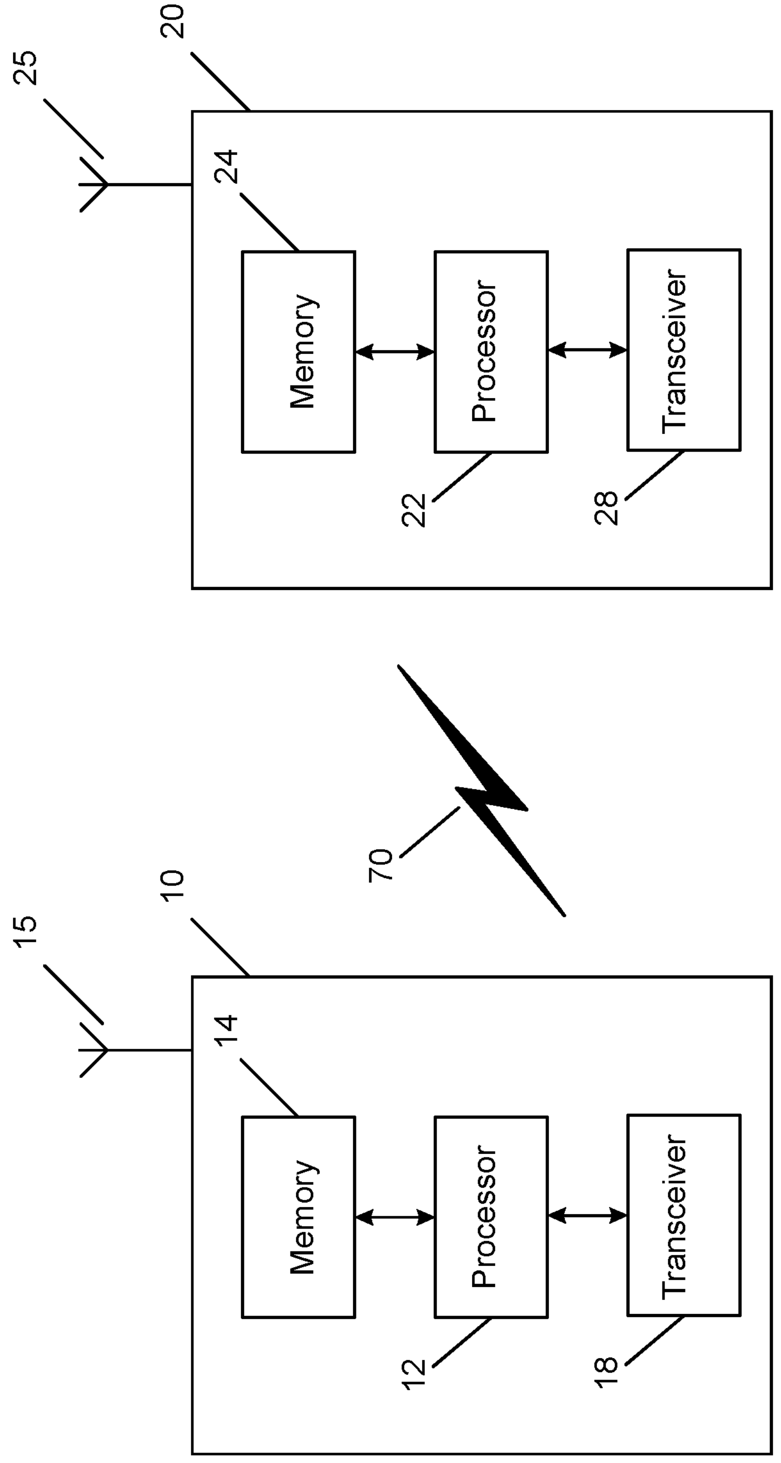
FIG. 1 illustrates an example block diagram of a system, according to an embodiment.
Figure 2:
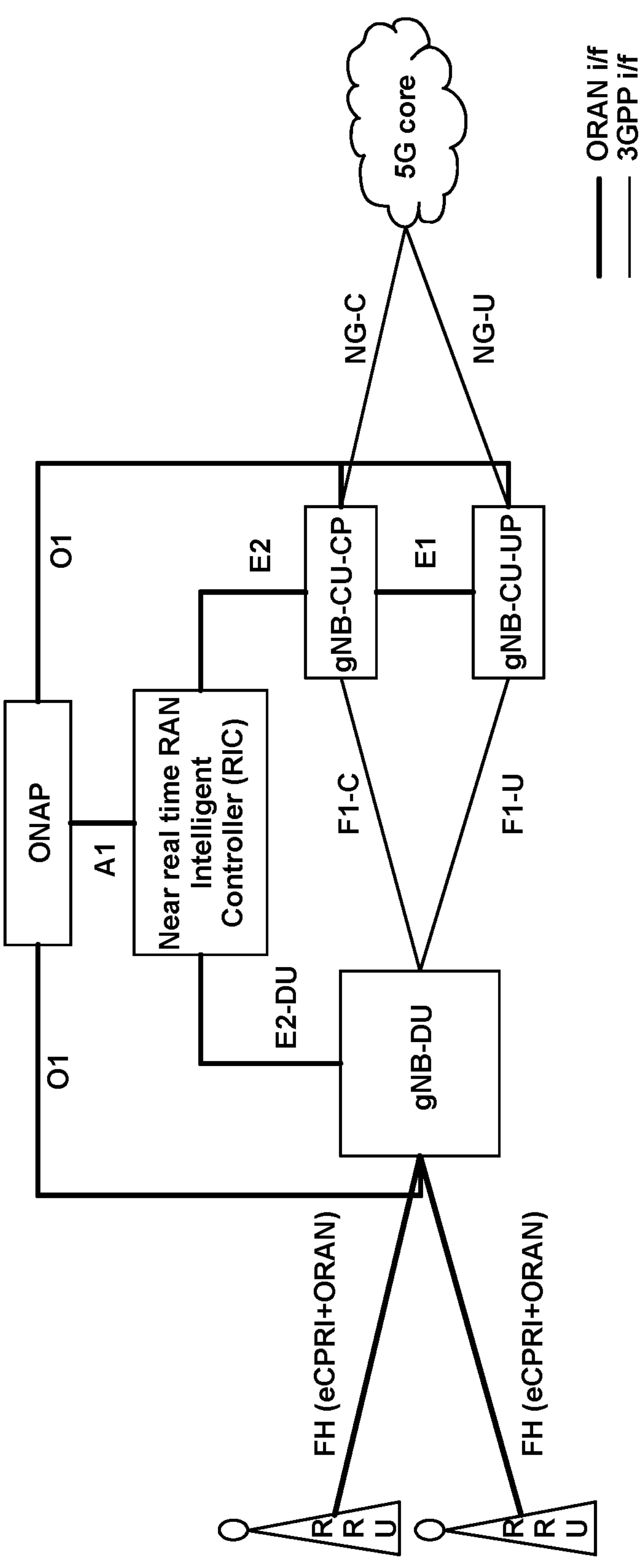
FIG. 2 illustrates overview on the 5G deployment model for the split gNB.

In this regard, reference is first made to FIGS. 1 and 2, where FIG. 1 shows a schematic block diagram of an exemplary apparatus or electronic device 50 usable in 5G and/or 6G networks.

FIG. 1 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 1.

As illustrated in the example of FIG. 1, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 1, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to static reporting by a user equipment of maximum sensitivity degradation and relaxation values thereof based on specific network configurations and capabilities of the user equipment.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein or any other method described herein. In some embodiments, as discussed herein, apparatus 10 may be configured to perform a procedure relating to providing static reporting by a user equipment of maximum sensitivity degradation and relaxation values thereof based on specific network configurations and capabilities of the user equipment, for example.

FIG. 1 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 1.

As illustrated in the example of FIG. 1, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 1, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 6-8 and 10, or any other method described herein. For example, in an embodiment, apparatus 20 may be controlled to perform a process relating to providing static reporting by a user equipment of maximum sensitivity degradation and relaxation values thereof based on specific network configurations and capabilities of the user equipment, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), or beyond 5G, e.g., 6G, without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

When control plane (a.k.a. c-plane) functionality is shared among multiple c-plane entities it may be relevant to route the NAS (e.g. UE service requests) and AS (e.g. RRC or LLP) messages as directly to the correct entity as possible. This may improve latency and may saves processing resources and/or time in one or more network entities. In accordance with an embodiment, the UE is allocated with a C-plane routing ID (CRID). This kind of allocation may be performed, for example, via RRC signalling. To allow best use of the cloud architecture, the CRID could be in a header of a layer of the protocol stack of the control plane of the network which is lower than the radio resource control layer (RRC). Such a lower layer could be a Packet Data Convergence Protocol (PDCP), a radio link layer (RLC) or a medium access layer (MAC). In other words, the CRID could be included in a PDCP header, an RLC header or a MAC header, or all of them. This kind of inclusion in a lower layer header aims to allow network to allocate the CRID close to the radio resource configuration entity. For the UE the usage of the CRID is quite simple as the UE just includes the CRID to the message header.

In other words, the network entity comprises a protocol stack having two or more layers in hierarchical order, wherein the one of the layers is at a lowest level and another layer is at the highest level in the layer hierarchy, and the other layers, if any, are between the lowest and highest layer. Hence, the control plane routing identifier may be included in a message header of a layer below the highest layer in the hierarchical order of layers to avoid the need to decode a whole message to determine whether the message is intended for that particular entity or not.

Figure 6:
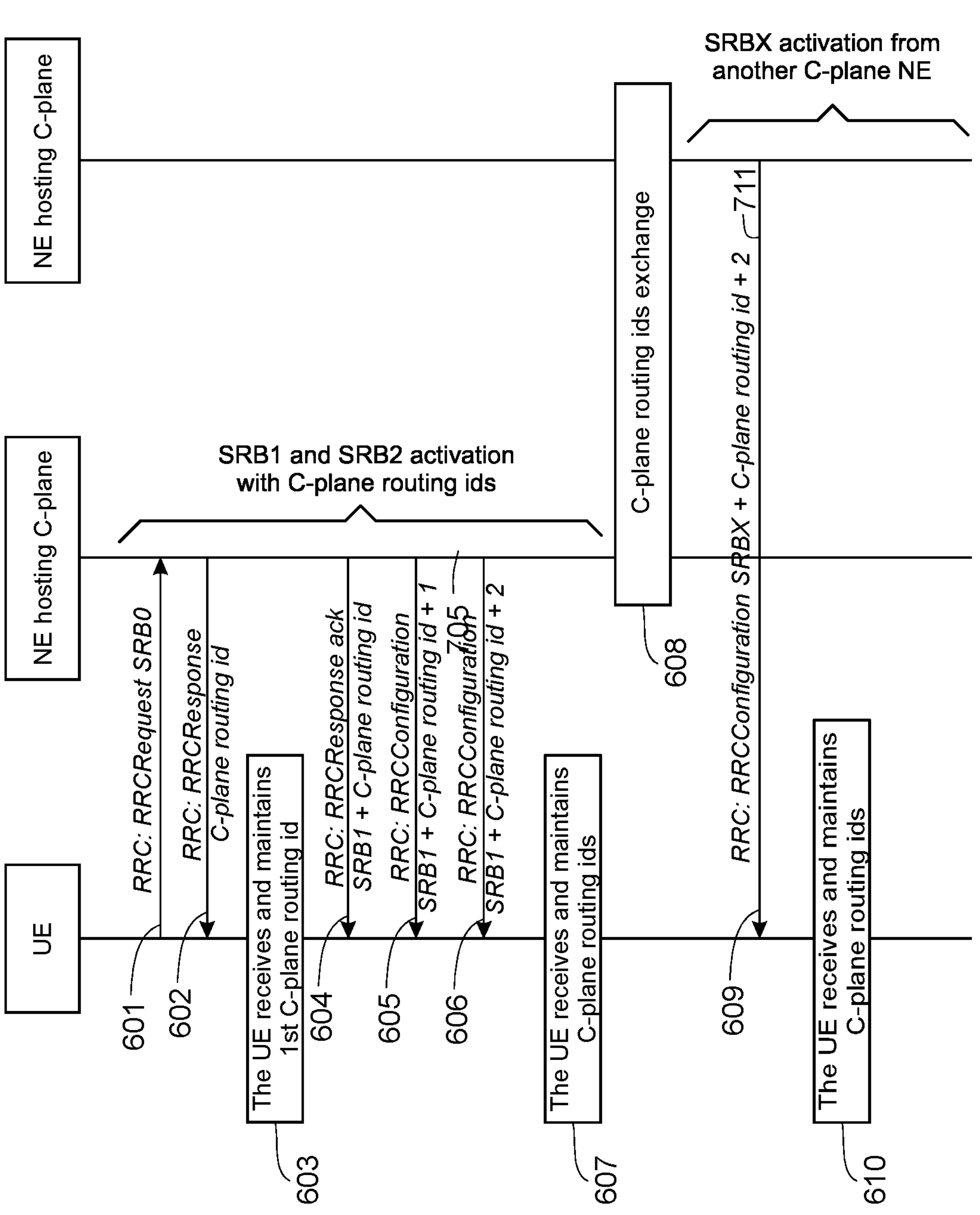
FIG. 6 illustrates an example of messages for allocation of control plane routing identifiers in a distributed RAN architecture, in accordance with an embodiment.

The CRID can identify a radio bearer and associates the UE with the radio resources configuration in a network entity that hosts C-plane functionality. There can be different network entities (e.g. CU, DU) that allocate subsequent identifiers for c-plane configurations. Though, the first and initial identifier to the UE needs to be allocated with initial RRC message. The network entities allocating subsequent CRIDs to the UE can exchange the configuration among each other (FIG. 6). The update procedure can be done by using messages or exchanged via UE context sharing between hosting C-plane entities.

FIG. 6 illustrates an example of messages for allocation of control plane routing identifiers in a distributed RAN architecture, in accordance with an embodiment. The UE sends 601 a radio resource control request message RRCRequest to a network entity which hosts the control plane. There may be more than one such network entity so the UE may select which one to send the request message. The network entity which receives the request may then select a control plane routing identifier for the requesting UE and send 602 as a response to the request a radio resource control response message RRCResponse to the UE. The UE receives the message and searches the control plane routing identifier from the message, e.g. from a PDCP header, an RLC header or a MAC header. The UE stores the control plane routing identifier as a first CRID in a memory to maintain 603 one or more CRIDs for later use. The network entity hosting the control plane sends 604 an RRCResponse acknowledgment message in which a first signalling resource block SRB1 is indicated and the control plane routing id of the UE is included. Hence, the correct UE may examine the CRID to determine whether this message is intended for that UE or not. When the UE determines that it is the intended receiver of the message, the UE can use the information contained in the message to e.g. determine the first signalling resource block SRB1.

In the example of FIG. 6 the network entity the hosting the control plane sends 605 also a radio resource control configuration message RRCConfiguration to the UE. The network element includes the information of the first signalling radio bearer and another control plane routing identifier (C-plane routing id+1, CRID_1) in the message. The UE receives and interprets the message, wherein the UE finds out that there is another control plane routing identifier associated with that UE to be used in communication via the first signalling radio bearer.

Furthermore in this example, the network entity the hosting the control plane sends 606 another radio resource control configuration message RRCConfiguration to the UE. The network element includes the information of a second signalling radio bearer and yet another control plane routing identifier (C-plane routing id+2, CRID_2) in the message. The UE receives and interprets the message, wherein the UE finds out that there is a third control plane routing identifier associated with that UE to be used in communication via the second signalling radio bearer.

The UE receives and interprets these messages and maintains 607 in the memory the received control plane routing identifiers (CRID, CRID_1, CRID_2) and information of the SRBs associated with these control plane routing identifiers.

The network entity which hosts the control plane exchanges 608 information of the selected control plane routing identifiers (CRID, CRID_1, CRID_2) with another network entity or entities which hosts the control plane. If the another network entity intents to activate a signalling radio bearer SRBX for the UE, the another network entity sends 609 a radio resource control configuration message RRCConfiguration to the UE. The network element includes the information of the signalling radio bearer SRBX and a control plane routing identifier selected among the control plane routing identifiers received from the first network entity. In this example the selected control plane routing identifier is the CRID_2.

The UE receives and interprets these messages and maintains 610 in the memory the received control plane routing identifier CRID_2 and information of the signalling radio bearer SRBX associated with this control plane routing identifier.

In accordance with an embodiment, the UE receives a plurality of control plane routing identifiers and information of one or more signalling radio bearers associated with these control plane routing identifiers. They may be received in one or more messages.

The UE stores the one or more control plane routing identifiers into the memory and also information of the association between the one or more control plane routing identifiers and the one or more signalling radio bearers. Hence, the UE may retrieve the control plane routing identifier(s) and information of the associated signalling radio bearer(s) from the memory when needed.

located in multiple computing units and the actual state is stored to a database like a shared data layer (SDL). In this kind of case the computing unit that performs the task may depend on available processing capacity and also location of the request but not what the computing unit has previously done.

In accordance with an embodiment, the network configures a number for the first signalling bearer and the second signalling bearer instead of using fixed numbering. Another alternative is that the existing signalling bearer numbering is kept but each signalling radio bearer setup to carry RRC message is allocated to a CRID so that the SRB configuration indicates when the UE should use which CRID. The CRID could be assigned to specific messages either explicitly (i.e., configured per RRC message) or implicitly (e.g. when CRID is present, it is used for all UE RRC messages).

The below example illustrates the first option, i.e. explicitly assigning the CRID to specific messages.

In accordance with an embodiment, the RRCSetup message is as follows:

```
-- ASN1START
-- TAG-RRCSETUP-START
RRCSetup::=                      SEQUENCE{
   rrc-TransactionIdentifier     RRC-TransactionIdentifier,
   criticalExtensions            CHOICE{
   rrcSetup                      RRCSetup-IEs,
   criticalExtensionsFuture      SEQUENCE{ }
}
}
RRCSetup-IEs::=                SEQUENCE{
   radioBearerConfig             RadioBearerConfig,
   masterCellGroup               OCTETSTRING(CONTAININGCellGroupConfig),
   lateNonCriticalExtension      OCTETSTRING              OPTIONAL,
   nonCriticalExtension          RRCSetup-v1700-IEs       OPTIONAL
}
RRCSetup-v1700-IEs::=          SEQUENCE{
   sl-ConfigDedicatedNR-r17      SL-ConfigDedicatedNR-r16     OPTIONAL,--CondL2RemoteUE
   sl-L2RemoteUE-Config-r17      SL-L2RemoteUE-Config-r17     OPTIONAL,--CondL2RemoteUE
   nonCriticalExtension        SEQUENCE{ }                    OPTIONAL
}
-- TAG-RRCSETUP-STOP
-- ASN1STOP
```

In the above example the steps 601 to 608 illustrate activation of the first signalling radio bearer SRB1 and the second signalling radio bearer SRB2 with control plane routing identifiers CRID, CRID_1, CRID_2. The steps 609 and 610 illustrate the signalling radio bearer SRBX activation from the other network entity hosting c-plane.

Figure 5:
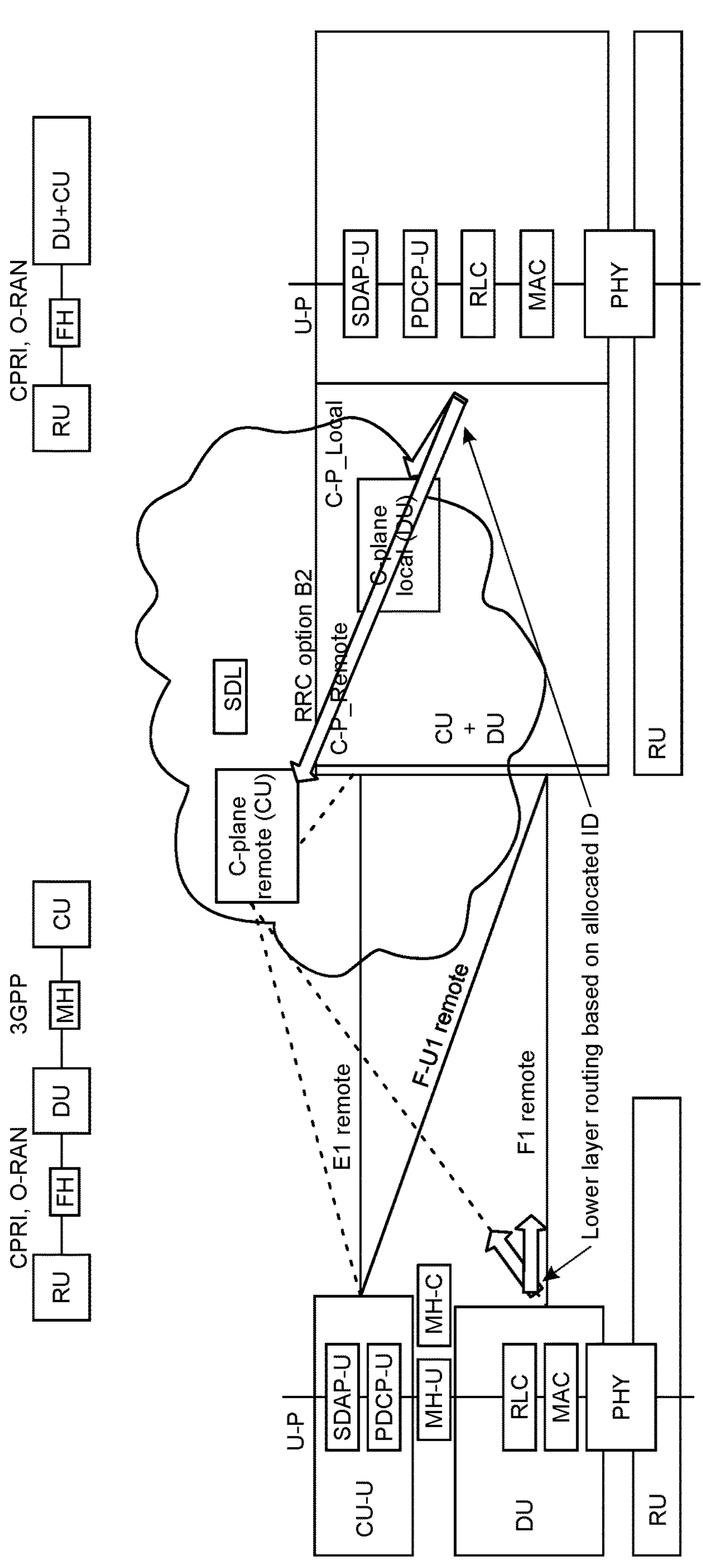
FIG. 5 illustrates UE request routing for service-based RAN architecture, in accordance with an embodiment.

FIG. 5 illustrates UE request routing for service-based RAN architecture, in accordance with an embodiment. With this option the network can optimize usage of local c-plane resources in the DU. Instead of using shared mode where the UE can be processed in multiple places the network defines what computing resources can be used for the UE. The local resources may be used to provide low latency service for URLLC type of services whereas for basic non-GBR only remote c-plane resources can be used.

This enables efficient usage of stateless architecture. When the software works in a stateless manner it only performs a task, stores the result of the task, and forgets the state. In a stateless system the same algorithm may be In the following, field descriptions of the RRCSetup information elements (IE) is provided.

masterCellGroup: The network configures only the RLC bearer for the SRB1, mac-CellGroupConfig, physicalCellGroupConfig and spCellConfig.

radioBearerConfig: Only the first signalling bearer SRB1 can be configured in RRC setup.

sl-ConfigDedicatedNR: This information element contains dedicated configurations for NR sidelink communication. The network configures only the PC5 Relay RLC channel and sl-PHY-MAC-RLC-Config used for the SRB1.

sl-L2RemoteUE-Config: This information element contains dedicated configurations used for L2 U2N relay related operation. The network configures only the SRAP configuration used for the SRB1.

L2RemoteUE: This field is mandatory present for L2 U2N Remote UE, otherwise it is absent.

In the following, field descriptions of the RadioBearerConfig information element is provided.

```
-- ASN1START
-- TAG-RADIOBEARERCONFIG-START
RadioBearerConfig::=        SEQUENCE{
  srb-ToAddModList            SRB-ToAddModList           OPTIONAL,--CondHO-Conn
  srb3-ToRelease            ENUMERATED{true}           OPTIONAL,--NeedN
  drb-ToAddModList            DRB-ToAddModList           OPTIONAL,--CondHO-toNR
  drb-ToReleaseList           DRB-ToReleaseList          OPTIONAL,--NeedN
  securityConfig              SecurityConfig             OPTIONAL,--NeedM
...,
  [[
  mrb-ToAddModList-r17        MRB-ToAddModList-r17         OPTIONAL,--NeedN
  mrb-ToReleaseList-r17       MRB-ToReleaseList-r17        OPTIONAL,--NeedN
  srb4-ToAddMod-r17           SRB-ToAddMod                 OPTIONAL,--NeedN
  srb4-ToRelease-r17          ENUMERATED{true}             OPTIONAL--NeedN
  ]]
}
SRB-ToAddModList::=         SEQUENCE(SIZE(1..2))OFSRB-ToAddMod
SRB-ToAddMod::=             SEQUENCE{
  srb-Identity                SRB-Identity,
  reestablishPDCP             ENUMERATED{true}             OPTIONAL,--NeedN
  discardOnPDCP               ENUMERATED{true}             OPTIONAL,--NeedN
  pdcp-Config                 PDCP-Config                  OPTIONAL,--CondPDCP
...,
  [[
  srb-Identity-v1700          SRB-Identity-v1700           OPTIONAL--NeedM
  ]],
  [[
  srb-RoutingID-r20           INTEGER(1..128)              OPTIONAL--NeedR
  ]]
}
```

When a network entity receives a message comprising the c-plane id, the network entity need not decode the whole message but only the lower layer header in which the c-plane id is included to determine whether that message is intended to that network entity or not. If the network entity determines, based on the c-plane id, that this message is intended for it the network entity may transfer the message to higher level layers in the protocol stack, wherein each layer may perform decoding operations related to it. On the other hand, if the network entity determines that this message is not intended for it the network entity need not decode the message any further or transfer to layers higher in the protocol stack. The network entity may instead forward the message to another entity in the network, for example.

When the UE is sending a message to the network, the UE may include the c-plane id to the message, or a plurality of c-plane ids, if the message or different parts of the message are intended to multiple different entities in the network. The c-plane id(s) may be retrieved from the memory of the UE, for example.

Figure 3:
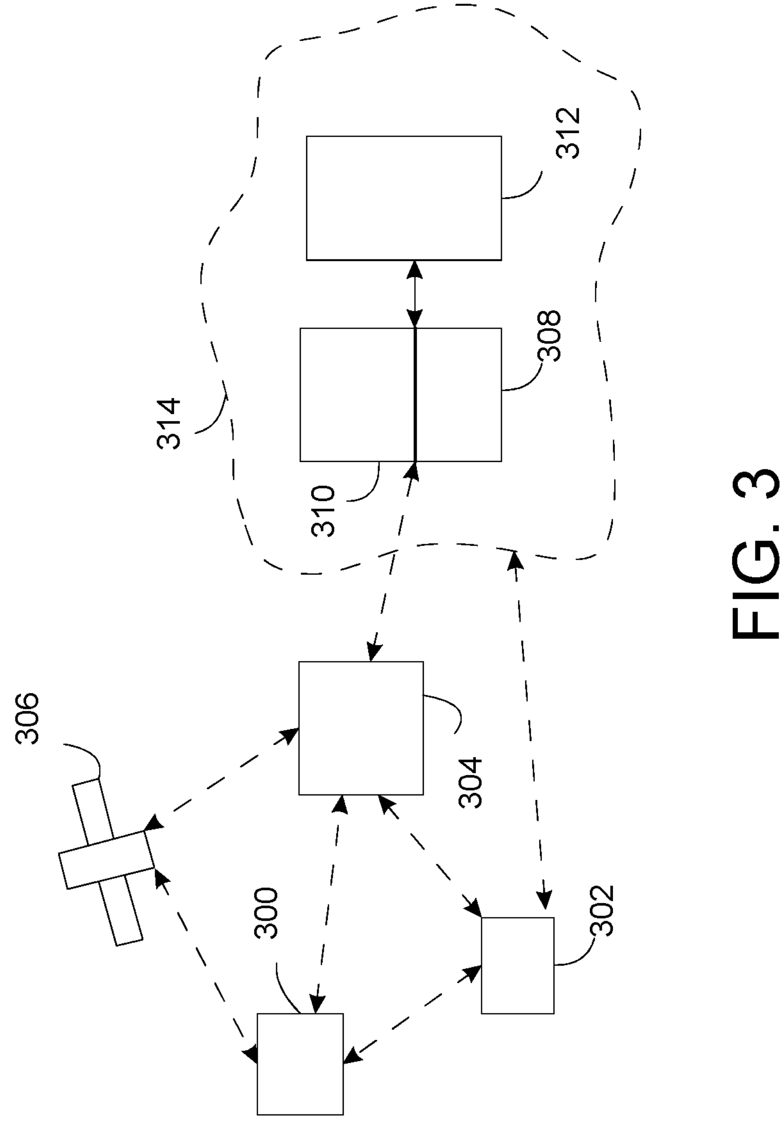
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB or a base transceiver station (BTS)) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node (such as Integrated Access and Backhaul (IAB) node), host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is or comprises a computing device configured to control the radio resources of communication system it is coupled to. The NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

In 5G NR and 6G NR, the User Plane Function (UPF) may be used to separate the control plane (c-plane) and the user plane (u-plane) functions. Therein, the Packet Gateway (PGW) control and user plane functions may be decoupled, whereby the data forwarding component (PGW-U) may be decentralized, while the PGW-related signaling (PGW-C) may remain in the core. This allows packet processing and traffic aggregation to be performed closer to the network edge, increasing bandwidth efficiencies while reducing network.

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT (Radio Access Technology) operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head, radio unit (RU) or base station comprising radio parts. It is also possible that node operations will be distributed among a plurality of servers, nodes or hosts. Application of cloud RAN architecture enables RAN real time functions being carried out at the RAN side (e.g. in a distributed unit, DU) and non-real time functions being carried out in a centralized manner (e.g. in a centralized unit, CU 308).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs (High Altitude Platform Stations). Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 3 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as RRC_IDLE (idle state without RRC connection and UE-based mobility), RRC_INACTIVE (idle state with partially stored RRC connection parameters and UE-based mobility), RRC_CONNECTED (connected state where UE can communicate with the network and uses network-based mobility). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states are controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ (Hybrid Automatic Repeat reQuest) feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

5G specifications provide an option to split the internal structure of a gNB into entities called CU (Central Unit) and one or more DUs (Distributed Unit), which are connected by an F1 interface, as specified in 3GPP 38.473. The split may provide traffic aggregation in terms of one gNB CU serving a plurality of gNB DUs operating as the actual node points for the air interface. The gNB-CU may be further split to CU-CP (Control Plane) and CU-UP (User Plane) and E1 interface has been introduced between them. Information of available resources and load must be shared across these network entities to implement various RRM (Radio Resource Management) functionalities.

FIG. 2 provides a basic overview on the 5G deployment model for the split gNB. The gNB comprises a Centralized Unit (gNB-CU) and one or more Distributed Units (gNB-DUs) connected to the gNB-CU. gNB-CU is a logical node that includes the gNB functions like user data transfer, Mobility management, Radio access network sharing, Positioning, Session Management etc., except such functions, which are allocated exclusively to the gNB-DU. gNB-CU controls the operation of gNB-DUs over F1 interface.

Figures 4A, 4B:
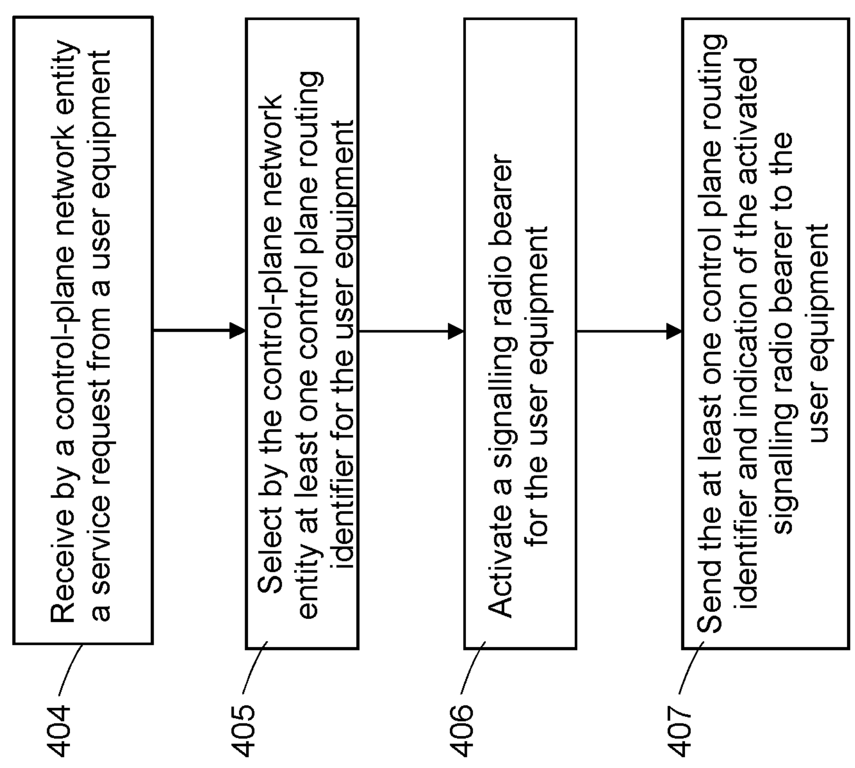
FIG. 4*a* shows a method according to an embodiment.
FIG. 4*b* shows a method according to another embodiment.

The method according to an embodiment is disclosed in flow chart of FIG. 4*a* as reflecting the operation of an apparatus, such as a control-plane network entity, in accordance with an embodiment. The method comprises receiving 401 by a control-plane network entity a service request from a user equipment, selecting 402 by the control-plane network entity at least one control plane routing identifier for the user equipment, and sending 403 the control plane routing identifier to the user equipment.

The method according to another embodiment is disclosed in flow chart of FIG. 4*b* as reflecting the operation of an apparatus, such as a control-plane network entity, in accordance with an embodiment. The method comprises receiving 404 by the control-plane network entity a service request from a user equipment, selecting 405 by the control-plane network entity at least one control plane routing identifier for the user equipment, activating 406 a signalling radio bearer for the user equipment, and sending 407 the control plane routing identifier and indication of the activated signalling radio bearer to the user equipment.

According to an embodiment, the method comprises associating the control plane routing identifier with one or more specific messages and/or triggering conditions.

According to an embodiment, the method comprises selecting a plurality of control plane routing identifiers for the user equipment and associating each of the selected control plane routing identifiers to a specific message and/or triggering condition.

According to an embodiment, the network entity comprising a protocol stack having two or more layers in hierarchical order, wherein the control plane routing identifier is included in a message header of a layer below the highest layer in the hierarchical order of layers.

According to an embodiment, the specific message is a radio resource control message, a location positioning protocol message or a non-access stratum message.

According to an embodiment, the method comprises indicating the control plane routing identifier explicitly in the message.

According to an embodiment, the method comprises indicating the control plane routing identifier implicitly in the message.

Figures 4C, 4D:
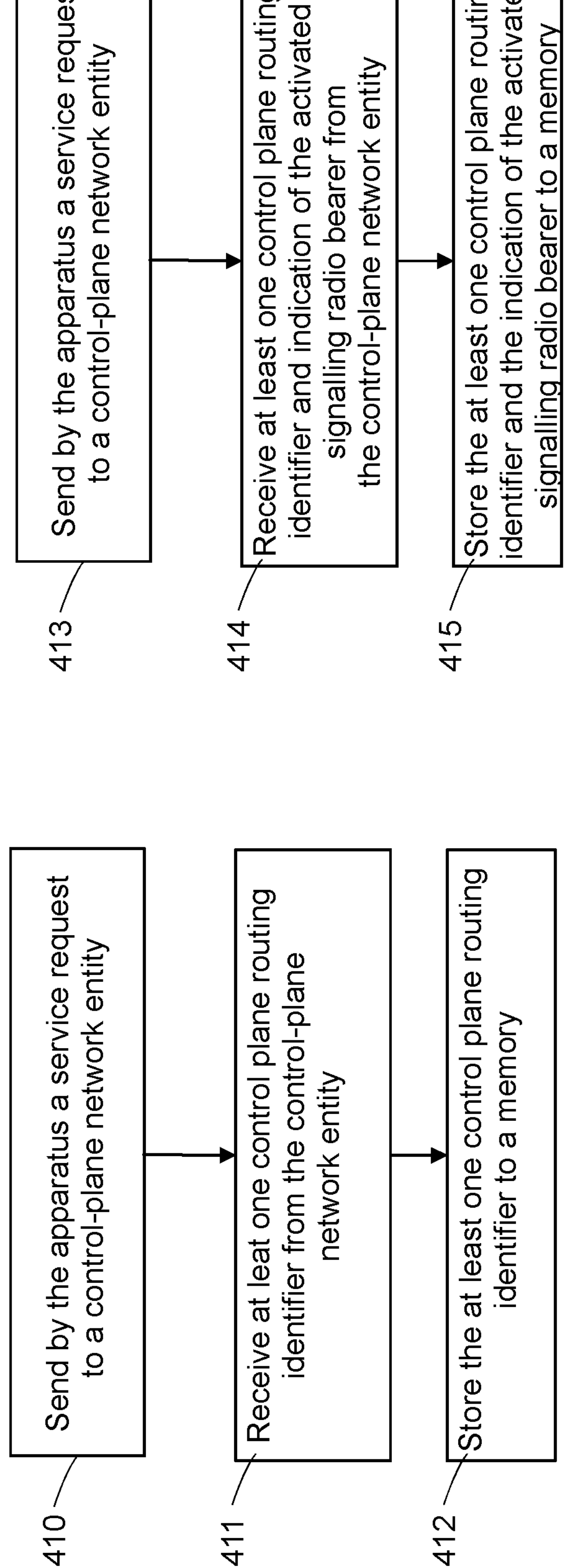

The method according to another embodiment is disclosed in flow chart of FIG. 4*c* as reflecting the operation of an apparatus, such as a user equipment. The method comprises sending 410 by the apparatus a service request to a control-plane network entity, receiving 411 at least one control plane routing identifier from the control-plane network entity, and storing 412 the at least one control plane routing identifier to a memory.

The method according to yet another embodiment is disclosed in flow chart of FIG. 4*d* as reflecting the operation of an apparatus, such as a user equipment. The method comprises sending 413 by the apparatus a service request to a control-plane network entity, receiving 414 at least one control plane routing identifier and indication of the activated signalling radio bearer from the control-plane network entity, and storing 415 the at least one control plane routing identifier and indication of the activated signalling radio bearer to a memory.

According to an embodiment, the method comprises including the at least one control plane routing identifier with one or more specific messages and/or triggering conditions.

According to an embodiment, the specific message is a radio resource control message.

According to an embodiment, the method comprises indicating the control plane routing identifier explicitly in the message.

According to an embodiment, the method comprises indicating the control plane routing identifier implicitly in the message.

According to an embodiment, the method comprises preparing a message for transmission to the network entity, and associating at least one control plane routing identifier with the message.

The method and the embodiments related thereto may be implemented in an apparatus implementing functionalities of a near-real-time radio access network intelligent controller or a user equipment.

Such apparatuses may comprise e.g. the functional units disclosed in FIG. 6 for implementing the embodiments.

A further aspect relates to a computer program product, stored on a non-transitory memory medium, comprising computer program code, which when executed by at least one processor, causes an apparatus at least to perform: receiving by the control-plane network entity a service request from a user equipment, determining by the control-plane network entity available resources in a network, selecting among the available resources an entity for configuring the requested service for the user equipment, and communicating with the selected entity to update context of the user equipment.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising:

at least one processor; and at least one memory, said at least one memory stored with computer program code thereon, the at least one memory and the computer program code configured to, with the at least one processor, cause the apparatus at least to perform:

receiving a service request from a user equipment;

selecting at least one control plane routing identifier for the user equipment, the control plane routing identifier corresponding to one of a plurality of control plane entities in a network;

sending the at least one control plane routing identifier to the user equipment;

receiving a message comprising a lower layer protocol header comprising the control plane routing identifier; and routing the message to the one of the control plane entities based on the control plane routing identifier.

2. The apparatus according to claim 1, wherein the apparatus is further caused to perform:

activating at least one signalling radio bearer for the user equipment for carrying control plane messages; and sending indication of the activated at least one signalling radio bearer to the user equipment.

3. The apparatus according to claim 1, wherein the apparatus is further caused to perform:

associating the at least one control plane routing identifier with one or more specific messages and/or triggering conditions.

4. The apparatus according to claim 1, wherein the apparatus is further caused to perform:

selecting a plurality of control plane routing identifiers for the user equipment and associating each of the selected control plane routing identifiers to a specific message and/or triggering condition.

5. The apparatus according to claim 1, comprising a protocol stack having two or more layers in hierarchical order, wherein the apparatus is further caused to perform:

including the control plane routing identifier in a message header of a layer below the highest layer in the hierarchical order of layers.

6. The apparatus according to claim 1, wherein the apparatus is further caused to perform:

including the control plane routing identifier in at least one of a packet data convergence protocol header, a radio link layer header, a medium access layer header.

7. The apparatus according to claim 5, wherein the apparatus is further caused to perform at least one of the following:

indicating the at least one control plane routing identifier explicitly in the message header;

indicating the at least one control plane routing identifier implicitly in the message header.

8. The apparatus according to claim 4, wherein the specific message is a radio resource control message, a location positioning protocol message or a non-access stratum message.

9. A method comprising:

receiving by a control-plane network entity a service request from a user equipment;

selecting by the control-plane network entity at least one control plane routing identifier for the user equipment, the control plane routing identifier corresponding to one of a plurality of control plane entities in a network;

sending by the control-plane network entity the at least one control plane routing identifier to the user equipment;

receiving a message comprising a lower layer protocol header comprising the control plane routing identifier; and routing the message to the one of the control plane entities based on the control plane routing identifier.

10. An apparatus comprising:

at least one processor; and at least one memory, said at least one memory stored with computer program code thereon, the at least one memory and the computer program code configured to, with the at least one processor, cause the apparatus at least to perform:

sending a service request to a control-plane network entity;

receiving at least one control plane routing identifier from the control-plane network entity, the control plane routing identifier corresponding to one of a plurality of control plane entities in a network;

storing the at least one control plane routing identifier to a memory;

generating a message comprising a lower layer protocol header comprising the control plane routing identifier to cause the message to be routed to the one of the control plane entities based on the control plane routing identifier.

11. The apparatus according to claim 10, wherein the apparatus is further caused to perform:

receiving an indication of at least one activated signalling radio bearer for carrying control plane messages.

12. The apparatus according to claim 10, wherein the apparatus is further caused to perform:

including at least one control plane routing identifier in one or more specific messages and/or triggering conditions.

13. The apparatus according to claim 10, wherein the apparatus is further caused to perform:

receiving a plurality of control plane routing identifiers each associated with a specific message and/or triggering condition.

14. The apparatus according to claim 13, wherein the specific message is a radio resource control message.

15. The apparatus according to claim 10, wherein the apparatus is further caused to perform at least one of the following:

retrieving the at least one control plane routing identifier explicitly from the message;

retrieving an implicit indication of the at least one control plane routing identifier from the message.

16. The apparatus according to claim 10, wherein the apparatus is further caused to perform:

preparing a message for transmission to the network entity; and associating the control plane routing identifier with the message.

17. The apparatus according to claim 10, wherein the apparatus is further caused to perform:

preparing a message for transmission to the network entity, wherein the message or a part of the message is intended to multiple different entities in the network; and associating a plurality of control plane routing identifiers with the message.

18. The apparatus according to claim 10, wherein the apparatus is further caused to perform:

storing the one or more control plane routing identifiers into a memory and information of association between the one or more control plane routing identifiers and the one or more signalling radio bearers.

19. The apparatus according to claim 18, wherein the apparatus is further caused to perform:

retrieving from the memory one or more of the control plane routing identifiers and information of one or more signalling radio bearers associated with the retrieved one or more control plane routing identifiers.

* * * * *